United States Patent [19]

Abe et al.

[11] 4,396,928
[45] Aug. 2, 1983

[54] PRINTER CONTROLLER FOR LASER BEAM PRINTER

[75] Inventors: Akira Abe, Hadano; Kikuo Hatazawa, Atsugi; Mitsuo Ohno, Hadano, all of Japan

[73] Assignee: Hitachi, Ltd., Tokyo, Japan

[21] Appl. No.: 259,166

[22] Filed: Apr. 30, 1981

[30] Foreign Application Priority Data

May 9, 1980 [JP] Japan .................................. 55-60653

[51] Int. Cl.³ .......................... G01D 15/00; H04N 1/04
[52] U.S. Cl. ..................................... 346/160; 358/293
[58] Field of Search ..................... 346/76 L, 108, 160, 346/139 R, 141; 358/285, 293, 300; 350/6.8

[56] References Cited

U.S. PATENT DOCUMENTS 3,750,189  7/1973  Fleischer ............................. 346/160
4,195,316  3/1980  Sansome ............................. 358/285

Primary Examiner—John Gonzales
Assistant Examiner—Thomas H. Tarcza
Attorney, Agent, or Firm—Antonelli, Terry & Wands

[57] ABSTRACT

A control system for controlling a laser beam printer in which a light-sensitive drum surface is scanned on a line base with a laser beam modulated in accordance with data to be printed. The width of scanning lines is broadened so that the adjacent scanning lines are partially superposed each other at those portions where both of the adjacent lines are to be irradiated with the laser light beam, while at those portions where at least one of the adjacent lines are not to be irradiated, the scanning line is reduced in width.

4 Claims, 8 Drawing Figures

LINE 1
LINE 2
LINE 3

| VALUES OF 21 | | | VALUES OF 22 | | | REGISTER MODE | | STATUS NO |
|---|---|---|---|---|---|---|---|---|
| a | b | c | a | b | c | WRITE | READ | |
| 0 | 0 | 0 | 0 | 0 | 0 | 301~302 ARE INITIALLY RESET | | STATUS 1 |
| 0 | 0 | 1 | 0 | 0 | 0 | 301 | 302, 303 | STATUS 2 |
| 0 | 1 | 0 | 0 | 0 | 1 | 302 | 301, 303 | STATUS 3 |
| 1 | 0 | 0 | 0 | 1 | 0 | 303 | 301, 302 | STATUS 4 |
| 0 | 0 | 1 | 1 | 0 | 0 | 301 | 302, 303 | STATUS 5 |

PRINTER CONTROLLER FOR LASER BEAM PRINTER

BACKGROUND OF THE INVENTION

The present invention retates in general to a laser beam printer. In particular, the present invention concerns control of a laser beam in the laser beam printer.

A general arrangement of the laser beam printer to which the invention is directed is illustrated in FIG. 1. In the case of the illustration, a laser device 12 is constituted by a semiconductor laser or the like which is capable of generating a modulated laser light beam. A light-sensitive drum 11 is rotated by a motor 17 in the direction indicated by an attached arrow. The laser beam modulated in accordance with information or data to be printed as is reflected by a polyhedral mirror 13 which is rotated by means of a motor 14, whereby the drum surface of the rotating light-sensitive drum 11 is scanned on a line-by-line base with the modulated laser light beam to produce latent images of patterns such as characters to be printed. An example of such scanning system is disclosed in U.S. Pat. No. 3,750,189. The latent images are subsequently developed with toner and transferred to a recording sheet. The development process is classified into a negative process and a positive process. In the case of the former, only those portions which are irradiated with light are developed by toner. To the contrary, according to the positive process, those portions which are not irradiated with light are developed in black while the portions undergone no irradiation remaining in blank.

More specifically, in the case of the positive development process, the peripheral surface of the photosensitive drum is uniformly charged with positive charge. When the drum surface is irradiated selectively with the modulated laser beam, electric charge on those portions of the drum surface which are subjected to the irradiation is annulled, while electric charge on the non-irradiated areas or locations remains as it is. Toner particles (i.e. developer) are charged with negative charge and adhere to those portions of the drum surface where the electric charge remains without having been erased. The toner image or images thus formed are transferred onto a recording sheet.

FIG. 2 illustrates fragmentally the drum surface of the light-sensitive drum 11 in the process of the positive development. In this figure, reference numeral 16 designates a single line scan (or a single raster line).

Symbol A represents areas or regions irradiated with light, while symbol B represents an area or location which has not been irradiated because of the laser beam having been interrupted due to the modulation. By the way, it is noted that the scanning line tends to be deviated upwardly or downwardly or takes a meandering path in dependence on the precision with which the polyhedral mirror is finished and/or distortions of the rotation axis. FIG. 3 illustrates a case in which an overlying scanning line has meandered along a curved path, whereby a zone B which has not been irradiated is produced and makes appearance on the recording sheet in a scratch-like form in black. Such failed line scan brings about a smear in the background of the printed record distinctly to an eyesore, particularly in the case of the positive development, involving degradation in the record or print quality.

SUMMARY OF THE INVENTION

Accordingly, it is an object of the invention to solve the problem described above and provides a laser beam printer system which can assure an improved print quality.

Another object of the invention is to provide a laser beam printer system in which areas or locations inherently to be irradiated with the laser light beam is positively prevented from not being irradiated even when the scanning with the laser beam is effected in an unsatisfactory manner.

According to an aspect of the invention, it is proposed that the scanning line is increased in width at those portions where adjacent raster scan lines are both to be irradiated, so that partial superposition or overlap may occur between the adjacent raster lines. On the other hand, at those portions where at least one of the adjacent lines is not to be irradiated, the scanning line is reduced in width.

DETAILED DESCRIPTION OF THE PREFERRED EMBODIMENT

Figure 1:
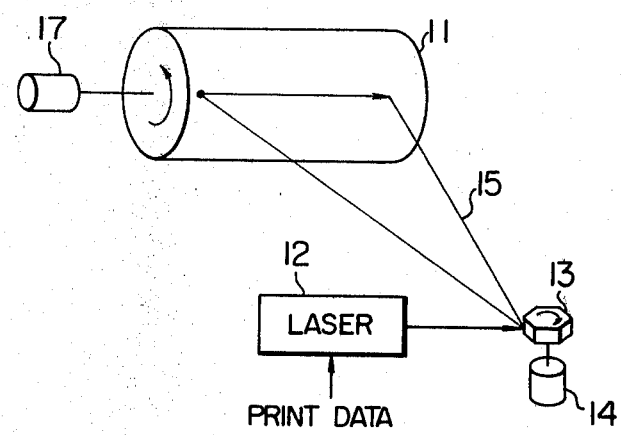
FIG. 1 shows schematically an arrangement of a laser beam printer in a fragmental pictorial view.
Figure 2:
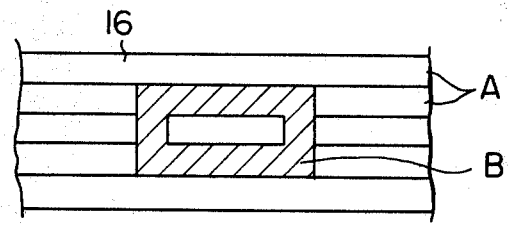
FIG. 2 shows a manner in which a light sensitive drum is scanned with a laser beam in a hitherto known laser beam printer system.
Figure 3:
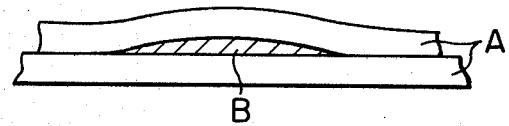
FIG. 3 shows a scanning with the laser beam in which a scanning line is displaced to take a meandering path in the hitherto known laser beam printer system.
Figure 4:
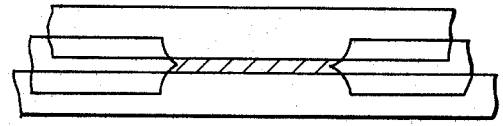
FIG. 4 illustrates a scanning manner on a light-sensitive drum in which scanning lines are partially superposed.

As an approach to solve the problem of the hitherto known laser beam printer, a scanning manner illustrated in FIG. 4 may be conceived, in which individual scanning lines are increased in width so that adjacent scanning lines are partially superposed on each other. With the scanning illustrated in FIG. 4, it is certainly possible to preclude occurrence of gaps between the adjacent scanning lines even when one of them is deviated or offset to some degree. However, it will be noted that the line portion which is not to be irradiated will be reduced in width, as can be seen from a hatched region shown in FIG. 4. In the case of printing characters, this means that lines or strokes constituting a character become correspondingly finer and thus difficulty is encountered particularly in printing the characters of a small size. That is, the printed character becomes unclear and it may happen in an extreme case that horizontal strokes disappear.

Figures 6, 8:
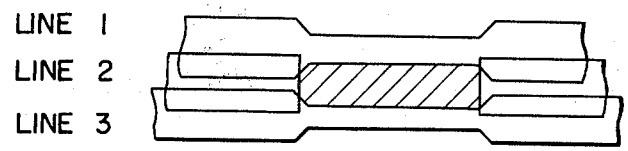
FIG. 6 graphically illustrates a manner in which a light-sensitive drum surface is scanned according to the teaching of the invention.
FIG. 8 shows a chart for illustrating operations of the printer control circuit shown in FIG. 7.

A more advantageous solution to the problem described above is illustrated in FIG. 6. As can be seen from this figure, the individual scanning lines are increased in width so that the adjacent lines are partially superposed each other. More specifically, FIG. 6 illustrates traces or paths along which the light-sensitive drum surface is irradiated with a laser light beam, wherein the line designated by a reference numeral 2 is resulted from the scanning with the laser beam which is modulated so that interruptions (only one is shown) occur in the line 2, as indicated by a hatched area in FIG. 6. In this connection, it is important to note that the lines 1 and 3 which are adjacent to the line 2 are narrowed in width at respective portions corresponding to the interruption of the line 2.

Now, the invention will be described in more detail in conjunction with exemplary embodiments thereof.

Figure 5:
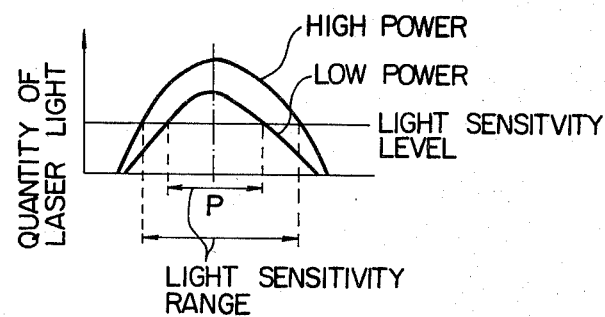
FIG. 5 graphically illustrates relationships between quantity of laser light and range of light sensitivity with laser power levels taken as parameter.

For narrowing the width of the scanning line or raster line, it is conceivable to constrict the laser beam with the aid of an optical lens system. However, in the case of the embodiments of the invention described below, it is presumed that the width of the scanning line is decreased by correspondingly adjusting the output power of a semiconductor laser device. FIG. 5 graphically illustrates relationships between quantity of laser light and a light sensitivity range with power levels of the semiconductor laser being taken as parameter. In FIG. 5, physical distance from the center P of a laser beam is taken along the abscissa, while the quantity of laser light is taken along the ordinate. It will be seen that the light quantity is at maximum at the center P of the laser beam and decreased progressively as the distance from the beam center P is increased. In the case where the laser output power is at a high level, the quantity of light is great although the diameter of the laser beam remains only slightly varied, as compared with the case where the laser output power is at a low level. In order that a light-sensitive material can respond to the irradiation by a laser light beam, the quantity of laser light should be greater than a predetermined light-sensitivity of the light-sensitive material as used. Consequently, when the laser power is low, the light sensitivity range is distinctively narrowed as compared with the case where the laser power is high. This phenomenon can be made use of for varying the width of the scanning line.

Print data (i.e. information or data to be printed) is constituted by sets of binary digits or bits "1" and/or "0" for representing patterns or images to be printed by sets of dots with the presence of a dot being indicated by the binary digit "1" while the absence of a dot is indicated by the binary bit of logic "0," as is conventional in CRT displays, wire matric printers and the like. The print data is stored in a memory.

In the printing operation, the print data is read out from the memory on a single line scanning base (i.e. for every line scanning) and processed by a controller to be utlimately supplied to the semiconductor laser.

The processing effected by the controller is summarized in the following table 1.

TABLE 1

| Current Data | Preceding Data | Succeeding Data | Power of Laser |
| --- | --- | --- | --- |
| 0 | 0 | 0 | Intensified |
| 0 | 0 | 1 | Weakened |
| 0 | 1 | 0 | |
| 0 | 1 | 1 | |
| 1 | 0 | 0 | Turned off |
| 1 | 0 | 1 | |
| 1 | 1 | 0 | |
| 1 | 1 | 1 | |

In the Table 1, bits at given positions of data for a scanning or raster line which data is currently being sent to a laser for driving and control thereof are listed at the leftmost column. The second column from the left contains those bits located at the same positions of data for a preceding scanning line. The third column contains bits at the same positions of data for a succeeding scanning line. At the rightmost column, the output conditions of the laser as determined by combinations of the bits on every row are inscribed. In this connection, it is noted that assumption is made such that the irradiation is effected in response to the bits "0" of the print data, while irradiation is inhibited for the bits "1" of the print data.

When the bit of data to be currently printed is logic "1," the power of the laser is rendered to be in the "OFF" state (i.e. turned off). On the other hand, when the bit of data to be currently printed is logic "0," the laser is intensified or powered up, provided that both the corresponding bits, one belonging to the data for the preceding scanning line with the other belonging to the data for the succeeding scanning line, are logic "0's." In contrast, when at least one of said two corresponding bits is logic "1," the laser output is weakened or lowered. In this way, the scanning with the laser beam in the manner illustrated in FIG. 6 can be accomplished.

Figure 7:
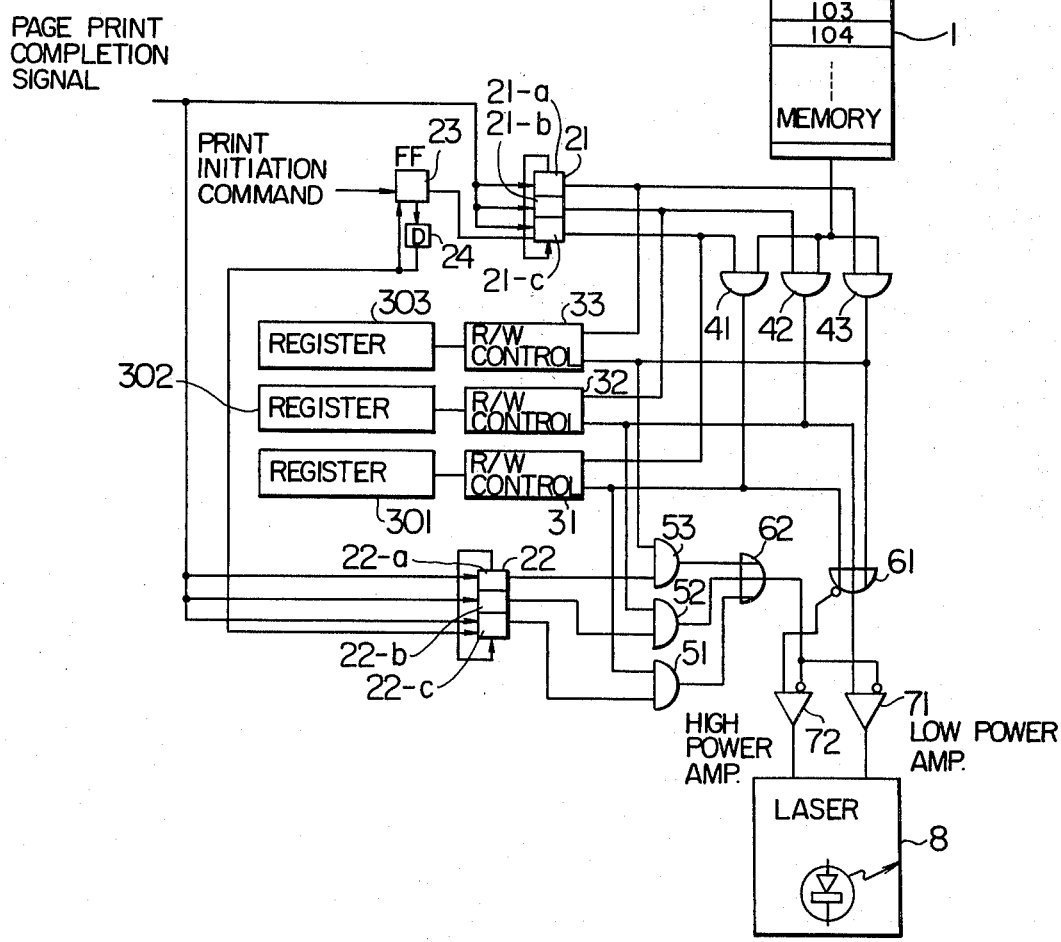
FIG. 7 shows in a block diagram a circuit arrangement of a printer control circuit according to an embodiment of the invention.

Referring to FIG. 7 which shows a control circuit for use in carrying out the invention, a reference numeral 1 denotes a memory for storing therein print data for one page of document. Numerals 101, 102, 103 and so forth represent the print data for a single scanning or raster line, respectively. The print data each for the single scanning line are read out from the memory 1 and stored in registers 301, 302 and 303, respectively. A reference numeral 8 designates a semiconductor laser which is adapted to be driven alternatively by a weakening or low power amplifier circuit 71 or by an intensifying or high power amplifier circuit 70. When the laser is driven through the high power amplifier circuit 72, the light sensitivity range elucidated hereinbefore is broadened such that mutual overlap or superposition is produced between the adjacent scanning or raster lines. On the other hand, when the laser is driven by the low power amplifier circuit 71, there is obtained substantially the same light sensitivity range in which no overlap is produced between the adjacent lines as in the case of the hitherto known laser beam printer.

Control of the read/write operations for the memory 1 and the registers 301, 302 and 303 as well as the control of operations of the driving amplifier circuits 71 and 72 are performed with the aid of read/write controllers 31 to 33 and a group of gates 41–43, 51–53, 61, 62 which are operated under the command of timing control circuits 21 and 22. Each of the timing control circuits 21 and 22 is constituted by a shift register of circulation type, wherein the shifting operation takes place from the bottom to the top and is looped back to the bottom, as viewed in FIG. 7. When a print starting signal is supplied from the controller described hereinbefore upon printing operation, a flip-flop 23 is set, resulting in that a register stage 21-c of the timing control circuit 21 is set. This state is thereafter circulated in the shift register constituting the timing control circuit 21 so that one of the register stages 21-a, 21-b and 21-c is always logic "1." Moreover, the output signal from the flip-flop 23 is applied to a register stage 22-c of the shift register 22 after having been delayed by a delay circuit 24 for a time required for a single shift to take place. The delayed signal thus obtained is also effective to reset the flip-flop 23. Thereafter, similar operation is repeated. When data of one page have been printed, a page print completion signal is applied, whereupon all the elements described above are reset. The read/write controllers 31, 32 and 33 allow write-in operations to the associated registers 301, 302 and 303, respectively, when logic "1" signal is applied thereto. Otherwise, the controllers 31, 32 and 33 are set to the read mode.

Now, operations of the control system shown in FIG. 7 will be described by referring to FIG. 8. At the beginning, both the shift registers 21 and 22 for the timing control are in the logic "0" state. The registers 301, 302 and 303 are also all in the reset state. Next, only the register state 21-c is set to the logic "1" state. Then, an AND gate 41 is opened (i.e. enabled) to allow the print data for a single line to be serially read out from the memory 1 and stored in the register 301 by way of the read/write command controller 31. At this time point, all the register stages 22-a, 22-b and 22-c are in the logic "0" state, whereby AND gates 51, 52 and 53 are all closed (i.e. blocked). Consequently, during the first line scanning, either one of the amplifier circuits 71 and 72 is selected to drive the semiconductor laser 8. Thus, whether the laser is at a high power lever or at a low power level, irradiation is performed throughout the first line for which all the binary bits are thus logic "0's." The shift registers 21 and 22 are shifted in timing with the reading of data for the first line from the memory 1 and the printing of the first line. As the result, the register stages 21-b and 22-c are next set to the logic "1" state. Then, the gate 42 is opened or enabled to allow the data 102 for the second scanning or raster line to be read out from the memory 1 and supplied to the OR gate 61 as well as the read/write command controller 32 which is thus set to the write-in mode, while the other read/write command controllers 31 and 33 remain in the read-out mode. This results in that the data 102 for the second line read out from the memory 1 is loaded into the register 302. Further, since only the AND gate 51 is opened with the other gates 52 and 53 being closed or blocked, the data contained in the register 301 is serially output and supplied to the low power amplifier 71 and the high power amplifier 72 through the OR gate 62. In dependence on the data transmitted through the OR gate 62, it is determined whether one of the amplifiers 71 and 72 is to be driven or both of these amplifiers are not to be driven. In other words, on the basis of this print data, it is also determined whether the laser beam is turned on or off. On the other hand, the output from the OR gate 61 is utilized for determining which one of the amplifiers 71 and 72 is to be selected. The output signal produced from the AND gate 42 at that time represents the data for the succeeding line and is effective to determine which one of the amplifiers 71 and 72 is to be selected. It will be noted that the reading operation from the memory 1 is effected in synchronism with the read-out operation from the register 301, 302 or 303.

As described hereinbefore, it is assumed that the binary digit of bit "0" of the print data corresponds to a blank dot area on a recording sheet while the bit "1" corresponds to a dot area to be printed in black. When the data bit output from the register 301 and transmitted through the AND gate 51 is logic "1," then, neither the low power amplifier 71 nor the high power amplifier 72 is driven, resulting in no generation of the laser light beam. On the other hand, when the data bit is logic "0," either the amplifier 71 or 72 is driven. In this conjunction, it is to be noted that the OR gate 61 is at that time applied with the data for the current scanning line as well as the preceding and the succeeding data from the memory 1 as well as from given two of the registers 301, 302 and 303, respectively. When the logic sun output from the OR gate 61 is logic "1," the low power amplifier 71 is selected. On the other hand, when the logic sum output signal is logic "0," the high power amplifier 72 is selected. When the current data subjected to the OR function is logic "0," the selection of the amplifier 71 or 72 depends on the other two data. On the contrary, when the current data is logic "1," neither the amplifier 71 nor 72 is driven. When the data for the current scanning line is logic "0" with either the preceding or the succeeding line data being logic "1," then the weakening or low power amplifier 71 is selected. In summary, when the data for the current scanning line is logic "1," neither the low power amplifier 71 nor the high power amplifier 72 is selected, resulting in interruption of the laser beam. Provided that the data for the current scanning line is logic "0" and that the data for both the preceding and the succeeding lines are at the same time logic "0's," the high power amplifier 72 is selected to drive the semiconductor laser 8. When the data for the current scanning line is logic "0" and either one of the data for the preceding or the succeeding line is logic "1," the low power amplifier 71 is selected to drive correspondingly the laser 8. Upon completion of the single line scanning, the state "1" in the shift registers 21 and 22 is shifted by one stage to thereby permit the read out of data 103 from the memory 1, whereby operations similar to those described above are performed. At that time (status 4 in FIG. 8), only the read/write command controller 33 is in the write-in mode with the AND gates 43 and 52 being enabled. Subsequently, the status 5 illustrated in FIG. 8 is established. Thereafter, operations in the statuses 3, 4 and 5 are sequentially repeated until the printing of one page has been completed.

With the arrangement of the control system described above, the printing can be effected in such a manner that the scanning or raster line is reduced in width at portions where data for the preceding and/or the succeeding lines are to be printed in black, as illustrated in FIG. 6. Otherwise, the current scanning line is increased in width so as to be partially superposed on the preceeding and succeeding lines. Superposition of the lines can be realized by selecting the diameter of the laser beam, the scanning speed and the rotational speed of the light-sensitive drum at appropriate values, respectively. Although the foregoing description has been made on the assumption that the width of the scanning line is selectively broadened or narrowed by adjusting correspondingly the driving power of the semiconductor laser, it will be appreciated that any mechanical means which will readily occur to those skilled in the art may be used to the same effect.

We claim:

1. A printer controlling system applied to a laser beam printer which incorporates a laser, scanning means for scanning a light-sensitive member with a laser beam on a line base, comprising:
first means for supplying pattern data to be printed for every scanning line, the pattern data for each of said scanning lines being constituted by a serial train containing serially first type binary digits which command irradiation with the laser beam and second type binary digits which command non-irradiation by said laser beam;

second means for effecting the scanning on the line base in such a width that the scanning lines adjacent to each other are superposed on each other;

third means for effecting said scanning in a line width which is narrower than that effected by said second means; and fourth means for receiving the pattern data from said first means to respond to said first type binary digit to thereby select said second means when both digits of scanning lines which precedes and succeeds, respectively, to the scanning line corresponding to said received pattern data are said first type digit at same digit positions, while selecting said third means when at least one of said both digits is said second type binary digit.

2. A printer control system as set forth in claim 1, wherein said first type binary digit corresponds to an area not to be printed, and said second type binary digit corresponds to an area to be printed.

3. A printer control system as set forth in claim 1, wherein said second means includes first driving means for driving said laser with a power for causing the adjacent scanning lines to be superposed on each other, and said third means includes second driving means for driving said laser with a lower power than said first driving means.

4. A printer control system as set forth in claim 1, said fourth means including:

three registers each being adapted to store therein the pattern data for a single scanning line;

selecting means for selecting one of said first and second means;

fifth means for receiving the pattern data from said first means to supply serially the pattern data for every scanning line to said selecting means and store said pattern data in the register which contains the oldest pattern data;

sixth means for supplying to said selecting means in synchronism with said fifth means the pattern data which is stored in one of the other registers than the one caused to store the pattern data by said fifth means and which is older than the pattern data stored in the other remaining register; and seventh means for reading out serially the pattern data stored in said other remaining register in synchronism with said fifth and said sixth means and driving one of said second and said third means selected by said selecting means only when said first type binary digits make appearance in said data pattern as read out, wherein said selecting means responds to said fifth and said sixth means to select said second means only when said first type binary digits make appearance simultaneously in the pattern data supplied from said fifth and said sixth means.

* * * * *